United States Patent
Oh et al.

(10) Patent No.: US 8,023,652 B2
(45) Date of Patent: Sep. 20, 2011

(54) APPARATUS AND METHOD FOR IMPLEMENTING DIGITAL RIGHTS MANAGEMENT SYSTEMS IN LOW-EFFICIENCY STORAGE DEVICE

(75) Inventors: Yun-sang Oh, Seoul (KR); Kyung-im Jung, Seongnam-si (KR); Sang-gyoo Sim, Suwon-si (KR); Suk-bong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1090 days.

(21) Appl. No.: 11/603,109

(22) Filed: Nov. 22, 2006

(65) Prior Publication Data

US 2007/0136204 A1 Jun. 14, 2007

(30) Foreign Application Priority Data

Nov. 29, 2005 (KR) .................. 10-2005-0114983

(51) Int. Cl.
*H04N 7/167* (2011.01)
*H04L 9/32* (2006.01)
*G06F 21/00* (2006.01)

(52) U.S. Cl. ............... 380/201; 705/59; 713/168
(58) Field of Classification Search .............. None
See application file for complete search history.

(56) References Cited

U.S. PATENT DOCUMENTS

| | | | |
|---|---|---|---|
| 7,120,250 B2 * | 10/2006 | Candelore ............ 380/200 | |
| 2004/0158712 A1 | 8/2004 | Lee et al. | |
| 2005/0044391 A1 | 2/2005 | Noguchi et al. | |
| 2006/0095382 A1 * | 5/2006 | Mahlbacher ............ 705/59 | |
| 2006/0107046 A1 * | 5/2006 | Raley et al. ............ 713/168 | |
| 2006/0130149 A1 * | 6/2006 | Xiang ............... 726/26 | |
| 2006/0277598 A1 * | 12/2006 | Ahn ............... 726/5 | |

FOREIGN PATENT DOCUMENTS

| | | |
|---|---|---|
| EP | 1 081 574 A1 | 3/2001 |
| JP | 10-187605 A | 7/1998 |
| JP | 2003-345763 A | 12/2003 |
| JP | 2004-21822 A | 1/2004 |
| JP | 2005-228170 A | 8/2005 |
| JP | 2005-234836 A | 9/2005 |
| KR | 10-2004-0077509 A | 9/2004 |
| KR | 10-2005-0004580 A | 1/2005 |
| KR | 10-2005-0032551 A | 4/2005 |

OTHER PUBLICATIONS

Communication dated May 18, 2010 from the Japanese Patent Office in Japanese Patent Application 2006-317283.
European Search Report, dated Nov. 18, 2010, issued in European Application No. 06124963.7.
Japanese Office Action issued on Mar. 29, 2011 in the corresponding Japanese Patent Application No. 2006-317283.

* cited by examiner

*Primary Examiner* — Shin-Hon Chen
(74) *Attorney, Agent, or Firm* — Sughrue Mion, PLLC

(57) ABSTRACT

A host device and a method of implementing Digital Rights Management (DRM) systems in a low-efficiency storage device are provided. The host device includes a plurality of DRM systems and a DRM system-shared interface module. The DRM systems provide pieces of DRM-related data and data identifiers (IDs) which identify the pieces of data. The DRM system-shared interface module adds DRM system IDs, which are used to identify the DRM systems, to the pieces of data and the data IDs, and provides results, which are obtained by adding the DRM system IDs, to a low-efficiency storage device.

28 Claims, 8 Drawing Sheets

APPARATUS AND METHOD FOR IMPLEMENTING DIGITAL RIGHTS MANAGEMENT SYSTEMS IN LOW-EFFICIENCY STORAGE DEVICE

CROSS-REFERENCE TO RELATED APPLICATION

This application claims priority from Korean Patent Application No. 10-2005-0114983 filed on Nov. 29, 2005 in the Korean Intellectual Property Office, the disclosure of which is incorporated herein by reference in its entirety.

BACKGROUND OF THE INVENTION

1. Field of the Invention

Methods and apparatuses consistent with the present invention relate to digital rights management (DRM) and, more particularly, to implementing a plurality of DRM systems in a low-efficiency storage device.

2. Description of the Related Art

Recently, research into DRM has been actively conducted, and commercial services to which DRM is applied have been introduced or are being introduced. DRM is a technological concept for protecting digital content, which is easy to illegally copy and distribute.

Although efforts to protect digital content have been made in the past, these efforts are however based on the prevention of illegal access to the digital content.

For example, access to the digital content is permitted only to users who have paid for it, and users who have not paid for it cannot access the digital content. However, due to the characteristics of digital data, the digital content can be easily reused, processed, duplicated, and distributed.

Accordingly, when the users, who have paid for and gained access to the digital content perform illegal duplication or distribution of the digital content, users who have not paid for the digital content can also use it.

In order to solve the problem, DRM allows digital content to be encrypted and distributed, and requires a license, called a Rights Object (RO), to use the encrypted digital content.

The concept of a related art DRM environment is described in detail with reference to FIG. 1 below.

Figure 1:
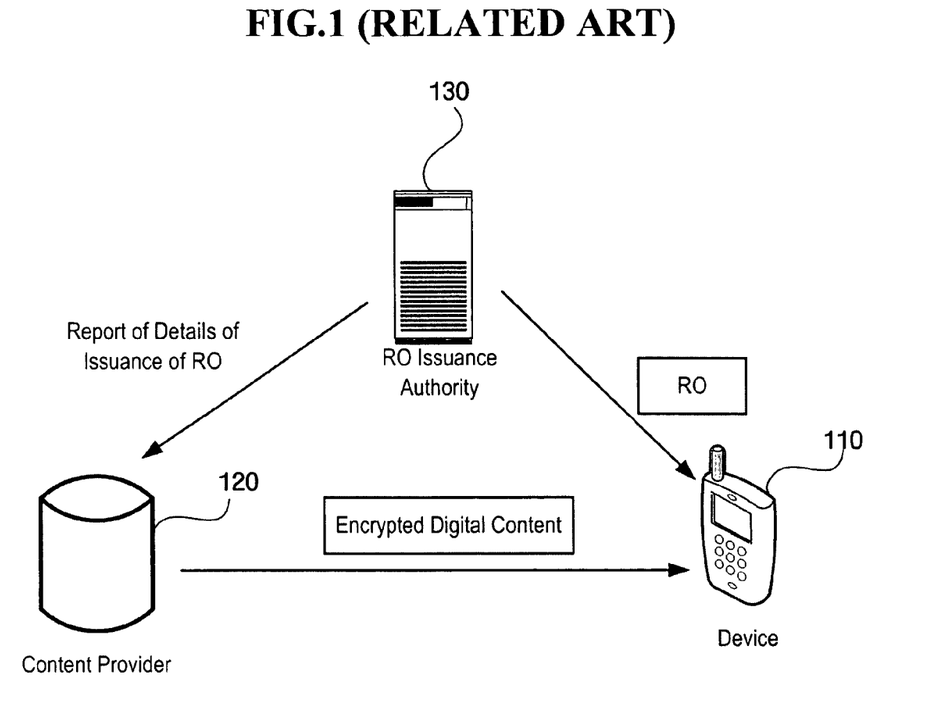
FIG. 1 is a diagram showing an example of the concept of a related art DRM environment.

Referring to FIG. 1, a device 110 can acquire digital content from a content provider 120. In this case, the digital content supplied by the content provider 120 is encrypted, and an RO is necessary to use the encrypted digital content.

The device 110 can acquire the RO, in which a right to use encrypted digital content is included, from an RO issuance authority 130. For this purpose, a user must make a predetermined payment for the digital content. The RO includes a key which enables the decryption of the encrypted digital content.

The RO issuance authority 130 reports the details of the issuance of the RO to the content provider 120. The RO issuance authority 130 and the content provider 120 may be the same entity according to the circumstances.

The device 110, which has acquired the RO, can use the decrypted digital content by consuming the RO.

The encrypted digital content may be uninterruptedly duplicated and distributed by another device (not shown). However, information about restrictions, such as the number of times of use or a period during which the encrypted digital content can be used, and the allowable number of duplications of the RO, are included in the RO, so that the RO is subjected to restrictions in the reuse or the duplication thereof, unlike the encrypted digital content. According to such DRM technology, the digital content can be effectively protected.

Figure 2:
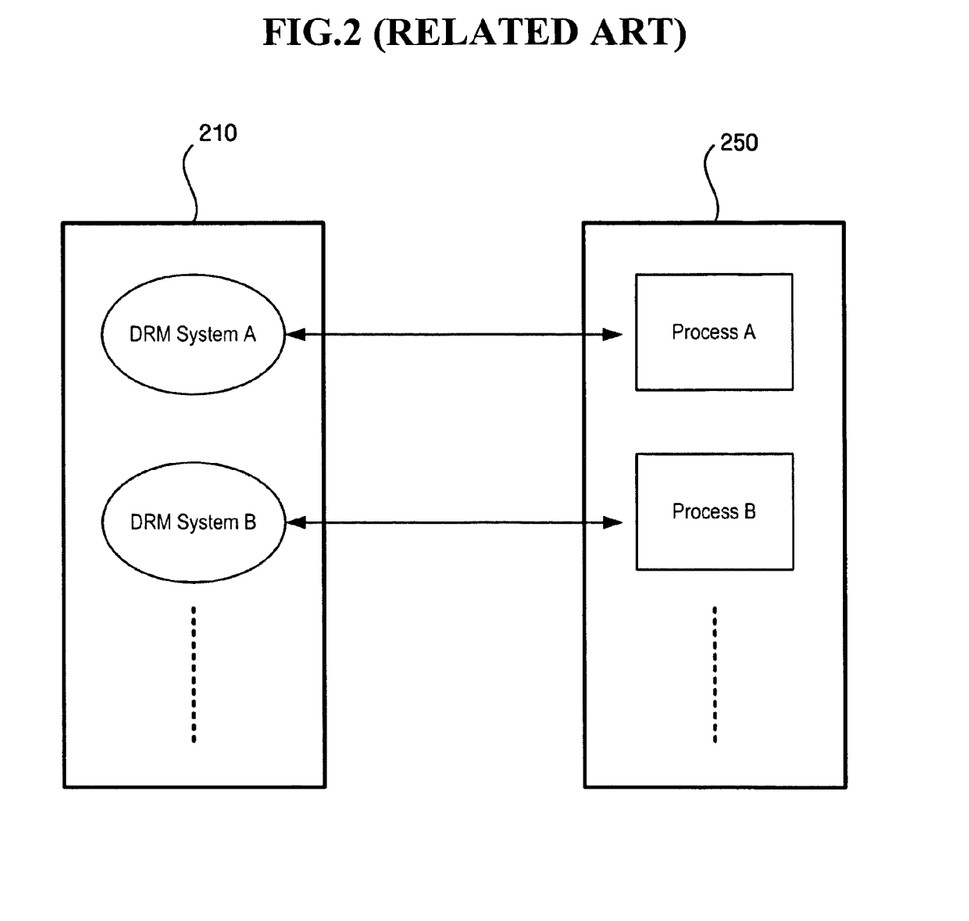
FIG. 2 is a diagram showing the related art relationship between a host device and a high-efficiency storage device for the management of DRM systems.

Furthermore, the device 110 may manage the encrypted digital content or the RO through a specific embedded system (hereinafter referred to as a 'high-efficiency storage device'), such as a Personal Computer (PC) or a mobile phone, in which multiple processes are supported in order to make it convenient to store and distribute the RO, which is shown in FIG. 2.

Referring to FIG. 2, a host device 210 corresponds to the device 110 shown in FIG. 1, and a high-efficiency storage device 250 provides a function of managing the digital content or the RO possessed by the host device 210.

In this case, the host device 210 includes a plurality of DRM systems, such as a Microsoft DRM system and an Open Mobile Alliance (OMA) DRM system. The DRM systems may simultaneously operate through multi-tasking. Hereinafter, a plurality of DRM systems having different DRM technologies are indicated by 'DRM system A,' 'DRM system B,' and the like to identify the respective DRM technologies.

Furthermore, the high-efficiency storage device 250 may perform some of the functions of the plurality of DRM systems included in the host device 210, such as functions to store DRM-related data, an RO, or digital content. In this case, multiple processes or multi-threaded processes are performed, as in the host device 210, in order to share the functions of the plurality of DRM systems that operate through multi-tasking in the host device 210.

The DRM system A of the host device 210 assigns process A to the high-efficiency storage device 250 to store and manage data about the DRM system A in the high-efficiency storage device 250, and communicates with the high-efficiency storage device 250. At the same time, the DRM system B assigns process B to the high-efficiency storage device 250 to store and manage data about the DRM system B in the high-efficiency storage device 250 in the same manner, and communicates with the high-efficiency storage device 250. In the same manner, N processes, which correspond to N DRM systems that simultaneously operate in the host device 210, are assigned to the high-efficiency storage device 250, and are simultaneously executed.

Figure 3:
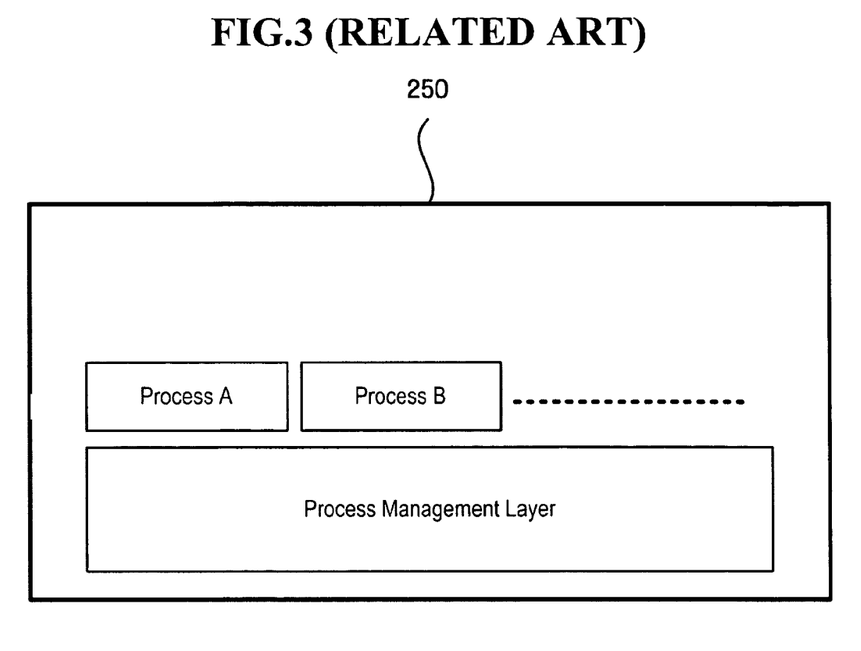
FIG. 3 is a diagram showing an example of the software architecture of the high-efficiency storage device shown in FIG. 2.

The high-efficiency storage device 250 may include the software architecture shown in FIG. 3, so that the N processes can be assigned.

Referring to FIG. 3, the high-efficiency storage device 250 includes a process management layer, which enables it to perform scheduling on respective processes (process A, process B, . . . ). In this case, the term 'scheduling' refers to planning and implementing a policy for assigning processes to a Central Processing Unit (CPU) or various processors in order to process tasks.

That is, the processes may be executed by using a preemptive technique or a non-preemptive technique, and the process management layer may perform inter-process scheduling using the preemptive technique or the non-preemptive technique. In this case, the term 'preemptive technique' refers to a technique in which, when a single process occupies the CPU, another process can take the CPU, and the term 'non-preemptive technique' refers to a technique in which, when a process occupies the CPU, another process cannot take the CPU until the processing of the initial process is finished.

Recently, in order to conveniently keep and distribute the encrypted digital content or the RO, the realization of a technology that allows the digital content or the RO to be managed through a mobile storage device, such as a memory stick or a Multi-Media Card (MMC), has been attempted.

However, in the mobile storage device, the operational capability thereof is very low compared with that of the high-efficiency storage device. Only a very small amount of resources are generally assured, and a minimum amount of resources are provided for economic reasons, such as price. Accordingly, the method of installing the process management layer shown in FIG. 3 in the mobile storage device is not a desired method to support the plurality of DRM systems shown in FIG. 2.

Accordingly, even for a low-efficiency mobile storage device, a method of efficiently implementing a plurality of DRM systems is required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for implementing DRM systems in a low-efficiency storage device, which allows a host device which has an environment in which a plurality of DRM systems operate simultaneously, to be connected with a mobile storage device which lacks a multi-process environment, and to store data (for example, digital content or an RO), which is generated and possessed by the respective DRM systems, in the mobile storage device.

The present invention also provides a method that allows the mobile storage device to accept requests from the plurality of DRM systems which operate in a multi-processing manner.

According to an aspect of the present invention, there is provided a host device including a plurality of DRM systems which provide pieces of DRM-related data and data Identifiers (IDs) for identifying the pieces of data; and a DRM system-shared interface module adding DRM system IDs, which are used to identify the DRM systems, to the pieces of data and the data IDs, and provides results, which are obtained by adding the DRM system IDs, to a low-efficiency storage device.

According to another aspect of the present invention, there is provided a host device including a plurality of DRM systems; and a DRM system-shared interface module which provides a DRM system ID, which is used to identify an arbitrary one of the DRM systems, data, which is related to the arbitrary DRM system identified by the DRM system ID, and a data ID, which is used to identify the data, to a low-efficiency storage device.

According to another aspect of the present invention, there is provided a host device, including a plurality of DRM systems; and a DRM system-shared interface module which provides a DRM system ID, which is used to identify an arbitrary one of the DRM systems, and data, which is related to the DRM system identified by the DRM system ID, to the low-efficiency storage device.

According to another aspect of the present invention, there is provided a host device including a plurality of DRM systems which provide data IDs, which are used to identify pieces of DRM-related data; and a DRM system-shared interface module which adds DRM system IDs, which are used to identify the DRM systems, to the data IDs, provides results, which are obtained by adding the DRM system IDs, to a low-efficiency storage device, and receives pieces of DRM-related data, which correspond to the DRM system IDs and the data IDs, from the low-efficiency storage device.

According to another aspect of the present invention, there is provided a host device including a plurality of DRM systems; and a DRM system-shared interface module which provides a DRM system ID, which is used to identify an arbitrary one of the DRM systems, and a data ID, which is used to identify data related to the DRM system identified by the DRM system ID, to a low-efficiency storage device, and receiving the DRM-related data, which corresponds to the DRM system ID and the data ID, from the low-efficiency storage device.

According to another aspect of the present invention, there is provided a host device including a plurality of DRM systems; and a DRM system-shared interface module which provides a DRM system ID, which is used to identify an arbitrary one of the DRM systems, to the low-efficiency storage device, and receives DRM-related data, which corresponds to the DRM system ID, from a low-efficiency storage device.

According to another aspect of the present invention, there is provided a method of implementing a plurality of DRM systems, the method including one of the DRM systems providing DRM-related data and a data ID, which is used to identify the data; adding a DRM system ID, which is used to identify the DRM system, to the data and the data ID; and transferring the data, the data ID, and the DRM system ID to a low-efficiency storage device.

According to another aspect of the present invention, there is provided a method of implementing a plurality of DRM systems, the method including providing a DRM system ID, which is used to identify an arbitrary one of the DRM systems, data, which is related to the arbitrary DRM system identified by the DRM system ID, and a data ID, which is used to identify the data, to a low-efficiency storage device; and storing the provided DRM system ID, data and data ID.

According to another aspect of the present invention, there is provided a method of implementing a plurality of DRM systems, the method including providing a DRM system ID, which is used to identify an arbitrary one of the DRM systems, and data, which is related to the arbitrary DRM system identified by the DRM system ID, to a low-efficiency storage device; and storing the provided DRM system ID and data.

According to another aspect of the present invention, there is provided a method of implementing a plurality of DRM systems, the method including providing a data ID used to identify DRM-related data; adding a DRM system ID, which is used to identify an arbitrary DRM system, to the data ID, and providing results, which are obtained by adding the DRM systems ID, to a low-efficiency storage device; and receiving the DRM-related data, which corresponds to the DRM system ID and the data ID, from the low-efficiency storage device.

According to another aspect of the present invention, there is provided a method of implementing a plurality of DRM systems, the method including providing a DRM system ID, which is used to identify an arbitrary one of the DRM systems, and a data ID, which is used to identify data related to the arbitrary DRM system identified by the DRM system ID, to a low-efficiency storage device; and receiving the DRM-related data, which corresponds to the DRM system ID and the data ID, from the low-efficiency storage device.

According to another aspect of the present invention, there is provided a method of implementing a plurality of DRM systems, the method including providing a DRM system ID, which is used to identify an arbitrary one of the DRM systems, to a low-efficiency storage device; and receiving DRM-related data, which corresponds to the DRM system ID, from the low-efficiency storage device.

BRIEF DESCRIPTION OF THE DRAWINGS

The above and other aspects of the present invention will be more clearly understood by describing in detail exemplary embodiments thereof with reference to the accompanying drawings, in which.

DESCRIPTION OF EXEMPLARY EMBODIMENTS

The advantages and characteristics of the present invention, and the method of achieving them, will be apparent with reference to the exemplary embodiments described in detail later in conjunction with the accompanying drawings. However, the present invention is not limited to the exemplary embodiments disclosed below, but may be implemented in various ways. Furthermore, the exemplary embodiments are provided to complete the disclosure of the present invention, and to fully notify those skilled in the art of the scope of the present invention. The exemplary embodiments of the present invention are defined only by the appended claims.

The present invention is described hereinafter with reference to flowchart illustrations of user interfaces, methods, and computer program products according to the exemplary embodiments of the invention. It will be understood that each block of the flowchart illustrations, and combinations of blocks in the flowchart illustrations, can be implemented using computer program instructions. These computer program instructions can be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-usable or computer-readable memory that can direct a computer or other programmable data processing apparatus to function in a particular manner, such that the instructions stored in the computer usable or computer-readable memory produce a manufactured article including instruction means that implement the function specified in the flowchart block or blocks.

The computer program instructions may also be loaded into a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Further, each block of the flowchart illustrations may represent a module, segment, or portion of code, which comprises one or more executable instructions for implementing the specified logical function(s). It should also be noted that in some alternative implementations, the functions noted in the blocks may occur out of this order. For example, two blocks shown in succession may in fact be executed substantially concurrently, or the blocks may sometimes be executed in reverse order, depending upon the functionality involved.

Hereinafter, a mobile storage device for which multi-processing is not supported is referred to as a 'low-efficiency storage device.'

Figure 4:
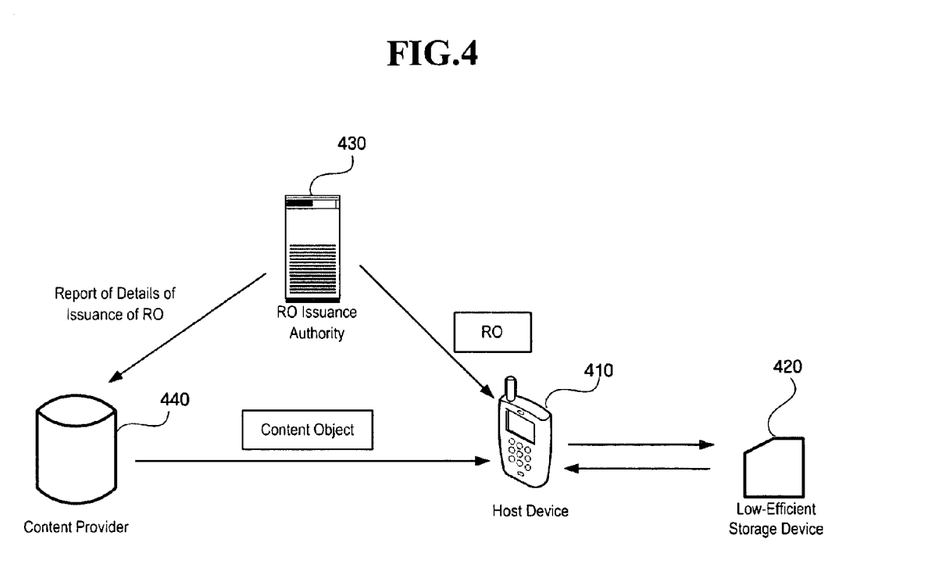
FIG. 4 is a diagram showing a DRM environment according to an exemplary embodiment of the present invention.

FIG. 4 is a diagram showing a DRM environment according to an exemplary embodiment of the present invention.

A user can acquire a content object from a content provider 440 through a host device 410 as in the related art manner. In this case, a content object is encrypted digital content, and the type of digital content is not limited to a moving image, a still image, audio, a game, or text.

Furthermore, the user can pay a predetermined charge and purchase an RO, which enables playback of the content object, from an RO issuance authority 430, and can store the purchased RO in the host device 410. In this case, the RO is a kind of license with which the right to use the content object is granted, and may include a content encryption or decryption key and permission or restriction information.

In this case, the permission information is information that indicates a method of playing back the content object and a method of duplicating the RO. Examples of the playback method may include 'play,' 'display,' 'execute,' and 'print.' The term 'play' refers to the right to provide a content object in audio or video form. For example, in the case where the content object relates to a moving image or music, 'play' may be set as permission information for the RO that will be used in order to play back the content object. Furthermore, the term 'display' refers to the right to provide the content object through a visual display device, and the term 'print' refers to the right to generate a hard copy of the content object. For example, in the case where the content object relates to a still image, at least one of 'display' and 'print' may be set as permission information for the RO which will be used in order to play back the content object. Furthermore, the term 'execute' refers to the right to use a game or some other type of content object such as an application program. For example, in the case where the content object is a java game, 'execute' may be set as the permission information for the RO that will be used in order to play back the content object.

Meanwhile, the duplication method may include, by way of example, 'copy' and 'move'. The terms 'copy' and 'move' refer to the right to store the RO, which is stored in the host device 410, in other devices. In this case, the low-efficiency storage device 420 may be one of the other devices.

Meanwhile, the restriction information is information about limits within which the content object can be played back, and one or more pieces of restriction information may be set for the permission information. The restriction information may include, by way of example, information about count restriction, date and time restriction, period restriction, and accumulated time restriction. In this case, the count restriction restricts the number of times that the content object can be played back. The date and time restriction restricts the date on which, and the time at which, the content object can be played back, and may include at least one of a start element and an end element. The period restriction restricts the period from the time at which the content object is first played back by using the RO to the time at which the content object will be played back in the future by using the RO. The accumulated time restriction restricts the total sum of time periods during which the content object can be played back by using the RO regardless of date.

Furthermore, the RO issuance authority 430 may notify the content provider 440 of the details of the issuance of the RO, and the RO issuance authority 430 and the content provider 440 may be the same entity.

The RO, which has been stored in the host device 410, may be stored in the low-efficiency storage device 420. In this case, the low-efficiency storage device 420 may have one or more ROs stored therein at the time of manufacture.

When the low-efficiency storage device 420 stores the RO, the host device 410 is connected with the low-efficiency storage device 420 and then uses the RO stored in the low-efficiency storage device 420, so that it can play back the content object.

Figure 5:
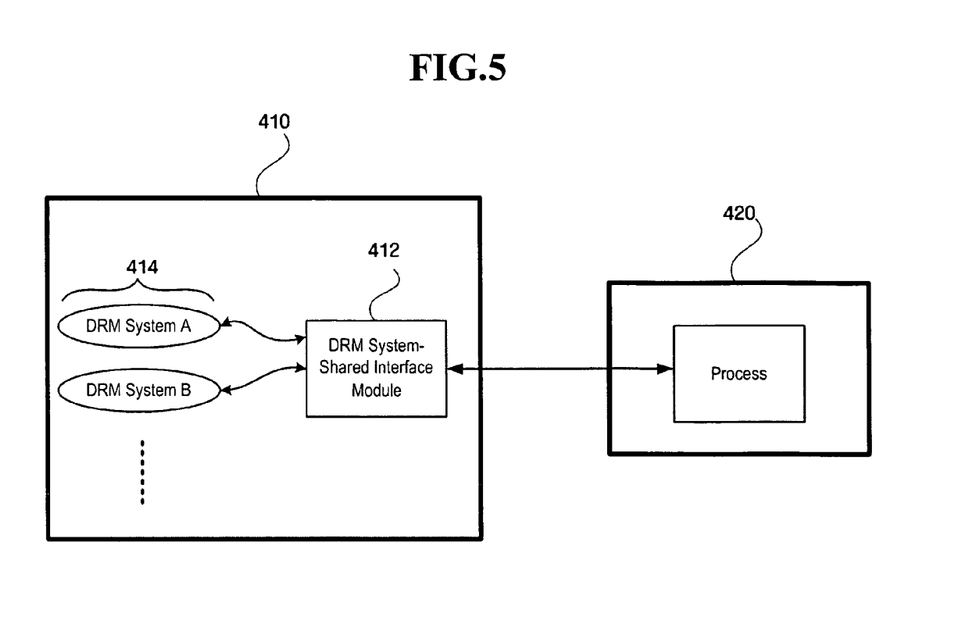
FIG. 5 is a diagram showing the relationship between a host device and a low-efficiency storage device for the management of DRM systems.

FIG. 5 is a diagram showing the relationship between a host device and a low-efficiency storage device for the management of DRM systems, and shows the situation in which the host device 410 stores DRM-related data in the low-efficiency storage device 420 or reads the DRM-related data from the low-efficiency storage device 420. In this case, the term 'DRM-related data' refers to data about the content object or the RO.

Referring to FIG. 5, the host device 410 includes a plurality of DRM systems 414 and the DRM system-shared interface module 412. The low-efficiency storage device 420 is supported by only a single process, so that the process management layer shown in FIG. 3 is not required.

In this case, the term 'module,' as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Furthermore, the components and modules may be implemented to operate one or more Central Processing Units (CPUs) residing in a device or a security multimedia card.

Referring to FIG. 5, the DRM system-shared interface module 412 of the host device 410 transfers DRM-related data for an arbitrary DRM system, which exists in the host device 410, to the low-efficiency storage device 420, or functions to add identification (ID) information about an arbitrary DRM system (hereinafter referred to as a 'DRM system ID'). Furthermore, the DRM system-shared interface module 412 functions to receive ID information about the DRM-related data (hereinafter referred to as a 'data ID') from each of the DRM systems and transfers the data ID to the low-efficiency storage device 420, or to transfer the data, which is stored in the low-efficiency storage device 420, to the corresponding DRM system of the host device 410.

In this case, although the DRM system-shared interface module 412 is illustrated in FIG. 5 as being installed in the host device 410 in software or hardware form, the exemplary embodiment of the present invention is not limited thereto. That is, the DRM system-shared interface module 412 may be a separate single product provided with connectors that can be connected to the host device 410 and the low-efficiency storage device 420.

Meanwhile, the low-efficiency storage device 420 communicates with the DRM system-shared interface module 412 regardless of the number of DRM systems that simultaneously operate in the host device 410, so that the process executed in the low-efficiency storage device 420 may only be a single process that communicates with the DRM system-shared interface module 412.

Figure 6:
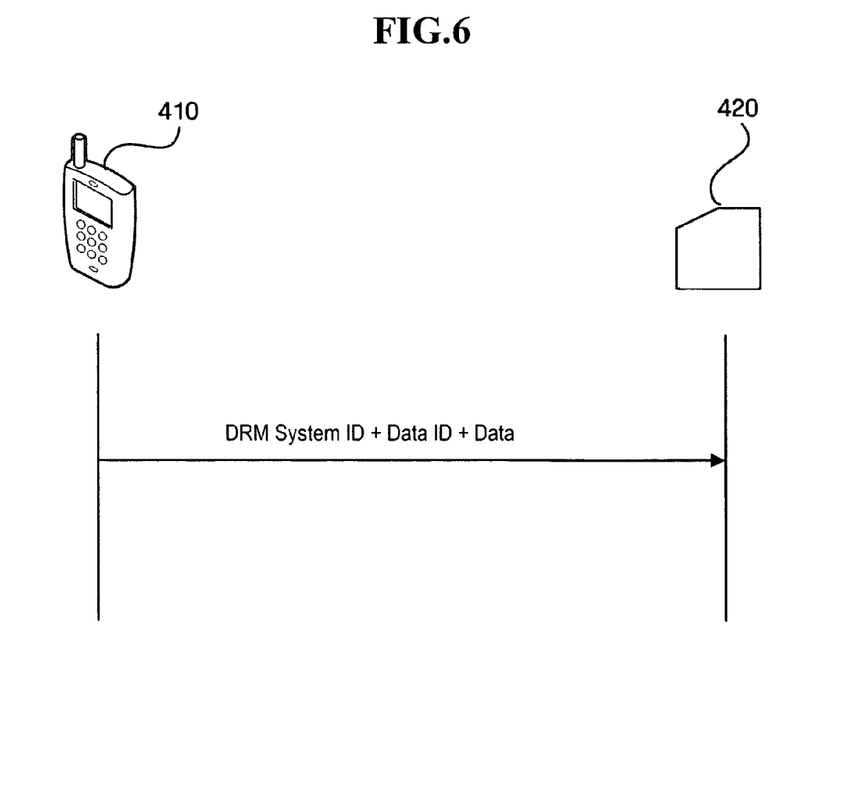
FIG. 6 is a diagram illustrating a method of storing data in the low-efficiency storage device according to an exemplary embodiment of the present invention.
Figure 7:
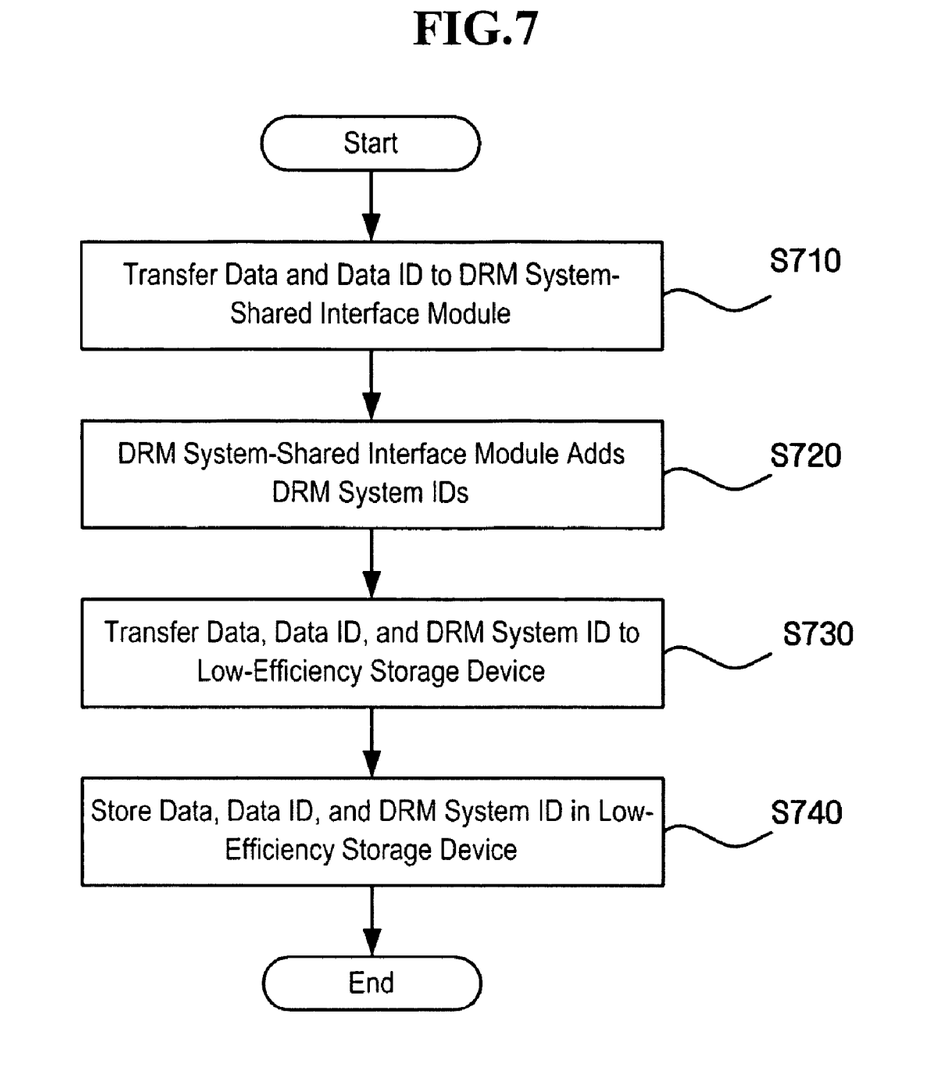
FIG. 7 is a flowchart illustrating the process of FIG. 6 in detail.

FIG. 6 is a diagram illustrating a method of storing data in the low-efficiency storage device according to an exemplary embodiment of the present invention, and shows an operation of the DRM system A of the host device 410 which stores the DRM-related data in the low-efficiency storage device 420 using a communication protocol between the DRM system-shared interface module 412 of the host device 410 and the process of the low-efficiency storage device 420, the operation of which is described in more detail in reference to the flowchart shown in FIG. 7 below.

First, the DRM system A transfers data and data ID, which are to be stored, to the DRM system-shared interface module 412 at operation S710. In this case, the data ID may include ID information about the content object, or ID information about the RO.

The DRM system-shared interface module 412 adds a DRM system ID for identifying the DRM system A at operation S720, and transfers the data, the data ID and the DRM system ID to the process of the low-efficiency storage device 420 at operation S730. In this case, the DRM system ID may be stored in an arbitrary storage region (not shown) that exists in the host device 410, or may be managed by the DRM system-shared interface module 412.

The process of the low-efficiency storage device 420 stores the data, the data ID, and the DRM system ID, which are received from the DRM system-shared interface module 412, in the storage region (not shown) of the low-efficiency storage device 420 at operation S740.

Although the host device 410 is illustrated in FIGS. 6 and 7 as transmitting the DRM system ID, the data ID and the data to the low-efficiency storage device 420, the exemplary embodiment of the present invention is not limited thereto. The host device 410 may allow the DRM system ID and data, provided by a corresponding DRM system, to be transferred to the low-efficiency storage device 420 and be stored therein. That is, in the case where it is not necessary to identify DRM-related data provided by a single DRM system, the data ID may not be transmitted.

Figure 8:
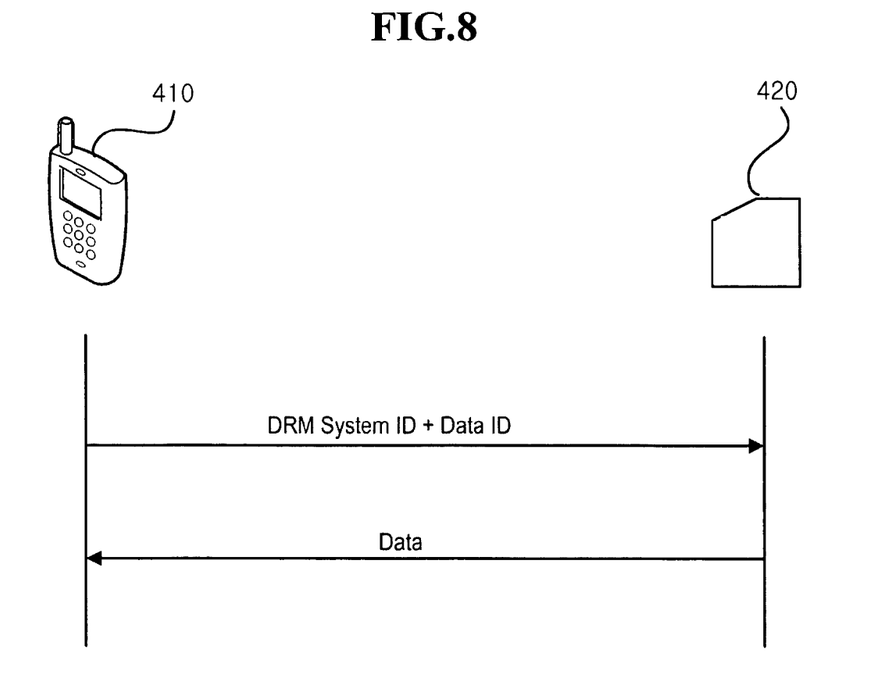
FIG. 8 is a diagram illustrating a method of reading data from the low-efficiency storage device according to an exemplary embodiment of the present invention.
Figure 9:
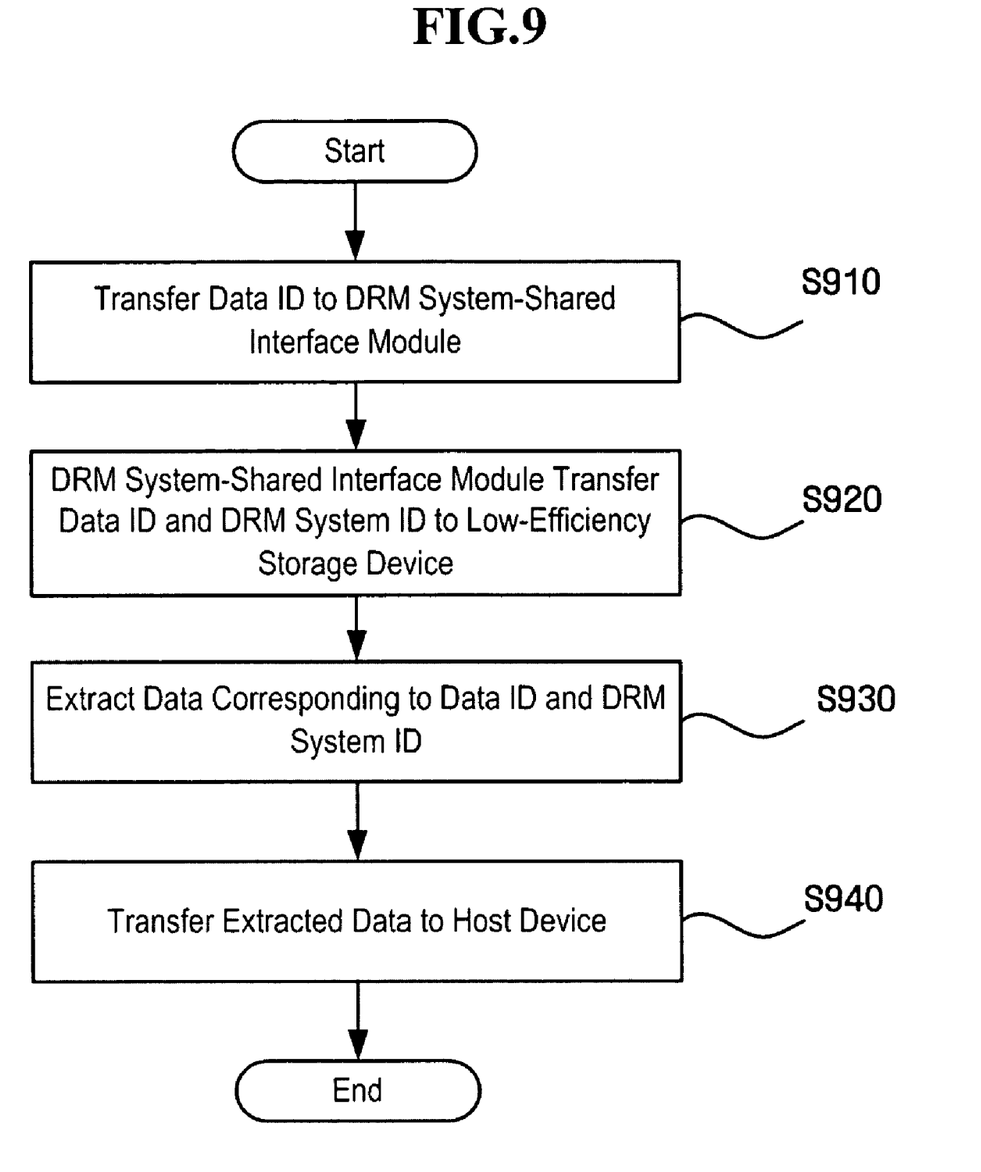
FIG. 9 is a flowchart illustrating the process of FIG. 8 in detail.

FIG. 8 is a diagram illustrating a method of reading data from the low-efficiency storage device according to an exemplary embodiment of the present invention, and shows an operation of the DRM system B of the host device 410 fetching the DRM-related data, which is already stored in the low-efficiency storage device 420, to the host device 410 using a communication protocol between the DRM system-shared interface module 412 of the host device 410 and the process of the low-efficiency storage device 420, the operation of which is described in more detail with reference to the flowchart shown in FIG. 9 below.

The DRM system B of the host device 410 transfers the data ID of data which will be fetched from the low-efficiency storage device 420, to the DRM system-shared interface module 412 at operation S910. Thereafter, the DRM system-shared interface module 412 transfers the transferred data ID and the DRM system ID which identifies the DRM system B to the process of the low-efficiency storage device 420 at operation S920.

In this case, the process of the low-efficiency storage device 420 extracts corresponding data from the storage region (not shown) of the low-efficiency storage device 420 based on the data ID and the DRM system at operation S930, and transfers the extracted data to the host device 410 at operation S940. In this case, the DRM system-shared interface module 412 of the host device 410 receives the transferred data and transfers it to the DRM system B.

Meanwhile, although the host device 410 is illustrated in FIGS. 8 and 9 as transferring the DRM system ID and the data ID to the low-efficiency storage device 420, the exemplary embodiment of the present invention is not limited thereto. The host device 410 may transfer only the DRM system ID to the low-efficiency storage device 420 and read the corresponding data. That is, in the case where it is not necessary to identify DRM-related data read by the host device 410, only corresponding DRM system ID information may be provided to the low-efficiency storage device 420.

In accordance with the exemplary embodiment of the present invention, the low-efficiency storage device can support the operation of the plurality of DRM systems that exist in the host device while maintaining its resources at a minimum level.

Furthermore, in accordance with the exemplary embodiment of the present invention, the pieces of DRM-related data of different DRM systems can be processed in the low-efficiency storage device in the same manner.

Furthermore, in accordance with the exemplary embodiment of the present invention, the DRM system-shared interface module is installed in the host device, so that, when a new DRM system appears, only a new DRM system-shared interface module may be installed, therefore it is not necessary to change an existing low-efficiency storage device.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A host device comprising:
   a low-efficiency mobile storage device which is removable from the host device;
   a plurality of Digital Rights Management (DRM) systems which provide pieces of DRM-related data and data identifiers (IDs) which identify the pieces of data; and
   a DRM system-shared interface module which adds DRM system IDs, which are used to identify the DRM systems, to the pieces of data and the data IDs, and provides results, which are obtained by adding the DRM system IDs to the pieces of data and the data IDs, to the low-efficiency mobile storage device,
   wherein the low-efficiency mobile storage device does not include the DRM system-shared interface module and the plurality of DRM systems, and
   wherein the low-efficiency mobile storage device is supported by only a single process that communicates with the DRM system-shared interface module.

2. The host device of claim 1, wherein the pieces of data comprise pieces of information about content objects.

3. The host device of claim 1, wherein the pieces of data comprise pieces of information about Rights Objects (ROs).

4. The host device of claim 1, wherein the low-efficiency storage device stores the pieces of data, the data IDs, and the DRM system IDs, which are received through the DRM system-shared interface module.

5. A host device comprising:
   a low-efficiency mobile storage device which is removable from the host device;
   a plurality of Digital Rights Management (DRM) systems; and
   a DRM system-shared interface module which provides a DRM system identifier (ID), which is used to identify one of the DRM systems, data, which is related to the DRM system identified by the DRM system ID, and a data ID, which is used to identify the data, to the low-efficiency mobile storage device,
   wherein the low-efficiency mobile storage device does not include the DRM system-shared interface module and the plurality of DRM systems, and
   wherein the low-efficiency mobile storage device is supported by only a single process that communicates with the DRM system-shared interface module.

6. A host device comprising:
   a low-efficiency mobile storage device which is removable from the host device;
   a plurality of Digital Rights Management (DRM) systems; and
   a DRM system-shared interface module which provides a DRM system identifier (ID), which is used to identify one of the DRM systems, and data, which is related to the DRM system identified by the DRM system ID, to the low-efficiency mobile storage device,
   wherein the low-efficiency mobile storage device does not include the DRM system-shared interface module and the plurality of DRM systems, and
   wherein the low-efficiency mobile storage device is supported by only a single process that communicates with the DRM system-shared interface module.

7. A host device comprising:
   a low-efficiency mobile storage device which is removable from the host device;
   a plurality of Digital Rights Management (DRM) systems which provide data identifiers (IDs), which are used to identify pieces of DRM-related data; and
   a DRM system-shared interface module which adds DRM system IDs, which are used to identify the DRM systems, to the data IDs, and provides results, which are obtained by adding the DRM system IDs to the data IDs, to the low-efficiency mobile storage device, and receives pieces of DRM-related data, which correspond to the DRM system IDs and the data IDs, from the low-efficiency mobile storage device;
   wherein the low-efficiency mobile storage device does not include the DRM system-shared interface module and the plurality of DRM systems, and
   wherein the low-efficiency mobile storage device is supported by only a single process that communicates with the DRM system-shared interface module.

8. The host device of claim 7, wherein the DRM system-shared interface module transfers the received pieces of DRM-related data to the DRM systems, respectively.

9. The host device of claim 7, wherein the pieces of DRM-related data comprise pieces of information about content objects.

10. The host device of claim 7, wherein the pieces of data comprise pieces of information about Rights Objects (ROs).

11. A host device comprising:
a low-efficiency mob storage which is removable from the host device;
a plurality of Digital Rights Management (DRM) systems; and
a DRM system-shared interface module which provides a DRM system identifier (ID), which is used to identify one of the DRM systems, and a data ID, which is used to identify data related to the DRM system identified by the DRM system ID, to the low-efficiency mobile storage device, and receives DRM-related data, which corresponds to the DRM system ID and the data ID, from the low-efficiency mobile storage device,
wherein the low-efficiency mobile storage device is separate from and external to the DRM system-shared interface module and the plurality of DRM systems, and
wherein the low-efficiency mobile storage device is supported by only a single process that communicates with the DRM system-shared interface module.

12. The host device of claim 11, wherein the DRM system-shared interface module transfers the received DRM-related data to a corresponding DRM system.

13. A host device comprising:
a low-efficiency mobile storage device which is removable from the host device;
a plurality of Digital Rights Management (DRM) systems; and
a DRM system-shared interface module which provides a DRM system identifier (ID), which is used to identify an arbitrary one of the DRM systems, to the low-efficiency mobile storage device, and receives DRM-related data, which corresponds to the DRM system ID, from the low-efficiency mobile storage device,
wherein the low-efficiency storage device does not include the DRM system-shared interface module and the plurality of DRM systems, and
wherein the low-efficiency mobile storage device is supported by only a single process that communicates with the DRM system-shared interface module.

14. The host device of claim 13, wherein the DRM system-shared interface module transfers the received DRM-related data to a corresponding DRM system.

15. A method of implementing a plurality of Digital Rights Management (DRM) systems in a host device including a low-efficiency mobile storage device that is removable from the host device, the plurality of Digital Rights Management (DRM) systems and a DRM system-shared interface module, the method comprising:
providing, from one of the DRM systems, DRM-related data and a data identifier (ID), which is used to identify the DRM-related data;
adding, by the DRM system-shared interface module, a DRM system ID, which is used to identify the DRM system, to the DRM-related data and the data ID; and
transferring, by the DRM system-shared interface module, the DRM-related data, the data ID, and the DRM system ID to the low-efficiency mobile storage device,
wherein the low-efficiency mobile storage device does not include the DRM system-shared interface module and the plurality of DRM systems, and
wherein the low-efficiency mobile storage device is supported by only a single process that communicates with the DRM system-shared interface module.

16. The method of claim 15, wherein the data comprises information about a content object.

17. The method of claim 15, wherein the data comprises information about a Rights Object (RO).

18. The method of claim 15, wherein the low-efficiency storage device stores received DRM-related data, data ID and DRM system ID.

19. A method of implementing a plurality of Digital Rights Management (DRM) systems in a host device including a low-efficiency mobile storage device that is removable from the host device, the plurality of Digital Rights Management (DRM) systems and a DRM system-shared interface module, the method comprising:
providing, by the DRM system-shared interface module, a DRM system identifier (ID), which is used to identify one of the DRM systems, data, which is related to the DRM system identified by the DRM system ID, and a data ID, which is used to identify the data, to the low-efficiency mobile storage device; and
storing the provided DRM system ID, the data and the data ID in the low-efficiency mobile storage device,
wherein the low-efficiency mobile storage device does not include the DRM system-shared interface module and the plurality of DRM systems, and
wherein the low-efficiency mobile storage device is supported by only a single process that communicates with the DRM system-shared interface module.

20. A method of implementing a plurality of Digital Rights Management (DRM) systems in a host device including a low-efficiency mobile storage device that is removable from the host device, the plurality of Digital Rights Management (DRM) systems and a DRM system-shared interface module, the method comprising:
providing, by the DRM system-shared interface module, a DRM system identifier (ID), which is used to identify one of the DRM systems, and data, which is related to the DRM system identified by the DRM system ID, to the low-efficiency mobile storage device; and
storing the provided DRM system ID and the data in the low-efficiency mobile storage device,
wherein the low-efficiency mobile storage device does not include the DRM system-shared interface module and the plurality of DRM systems, and
wherein the low-efficiency mobile storage device is supported by only a single process that communicates with the DRM system-shared interface module.

21. A method of implementing a plurality of Digital Rights Management (DRM) systems its a host device including a low-efficiency mobile storage device that is removable from the host device, the plurality of Digital Rights Management (DRM) systems and a DRM system-shared interface module, the method comprising:
providing a data identifier (ID) used to identify DRM-related data;
adding, by the DRM system-shared interface module, a DRM system ID, which is used to identify a DRM system, to the data ID, and providing, by the DRM system-shared interface module, results, which are obtained by adding the DRM systems ID to the data ID, to the low-efficiency mobile storage device; and
receiving DRM-related data, which corresponds to the DRM system ID and the data ID, from the low-efficiency mobile storage device,
wherein the low-efficiency mobile storage device does not include the DRM system-shared interface module and the plurality of DRM systems, and
wherein the low efficiency mobile storage device is supported by only a single process that communicates with the DRM system-shared interface module.

22. The method of claim 21, further comprising transferring the received DRM-related data to a corresponding DRM system.

23. The method of claim 21, wherein the data comprises information about a content object.

24. The method of claim 21, wherein the data comprises information about a Rights Object (RO).

25. A method of implementing a plurality of Digital Rights Management (DRM) systems in host device including low-efficiency mobile storage device that is removable from the host device, the plurality of Digital Rights Management (DRM) systems and a DRM system-shared interface module, the method comprising:
- providing, by the DRM system-shared interface module, a DRM system identifier (ID), which is used to identify one of the DRM systems, and a data ID, which is used to identify data related to the DRM system identified by the DRM system ID, to the low-efficiency mobile storage device; and
- receiving DRM-related data, which corresponds to the DRM system ID and the data ID, from the low-efficiency mobile storage device,
- wherein the low-efficiency storage device does not include the DRM system-shared interface module and the plurality of DRM systems, and
- wherein the low-efficiency mobile storage device is supported by only a single process that communicates with the DRM system-shared interface module.

26. The method of claim 25, further comprising transferring the received DRM-related data to a corresponding DRM system.

27. A method of implementing a plurality of Digital Rights Management (DRM) systems in a host device including a low-efficiency mobile storage device that is removable from the host device, the plurality of Digital Rights Management (DRM) systems and a DRM system-shared interface module, the method comprising:
- providing, by the DRM system-shared interface module, a DRM system identifier (ID), which is used to identify one of the DRM systems, to the low-efficiency mobile storage device; and
- receiving DRM-related data, which corresponds to the DRM system ID, from the low-efficiency mobile storage device,
- wherein the low-efficiency storage device does not include the DRM system-shared interface module and the plurality of DRM systems, and
- wherein the low-efficiency mobile storage device is supported by only a single process that communicates with the DRM system-shared interface module.

28. The method of claim 27, further comprising transferring the received DRM-related data to a corresponding DRM system.

* * * * *